(12) United States Patent
Ashmore et al.

(10) Patent No.: US 9,410,046 B2
(45) Date of Patent: Aug. 9, 2016

(54) CONTROLLED RELEASE COMPOSITION CONTAINING DCOIT

(71) Applicant: Rohm and Haas Company, Philadelphia, PA (US)

(72) Inventors: John W. Ashmore, Lansdale, PA (US); David M. Laganella, Swedesboro, NJ (US); Boris Polanuyer, Lansdale, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 14/435,633

(22) PCT Filed: Oct. 31, 2013

(86) PCT No.: PCT/US2013/067647
§ 371 (c)(1),
(2) Date: Apr. 14, 2015

(87) PCT Pub. No.: WO2014/074376
PCT Pub. Date: May 15, 2014

(65) Prior Publication Data
US 2015/0284572 A1 Oct. 8, 2015

Related U.S. Application Data

(60) Provisional application No. 61/722,948, filed on Nov. 6, 2012.

(51) Int. Cl.
*A01N 43/80* (2006.01)
*A01N 25/08* (2006.01)
*A01N 43/72* (2006.01)
*C09D 5/16* (2006.01)
*C09D 133/06* (2006.01)
*C09D 7/12* (2006.01)
*C08K 3/04* (2006.01)
*C08K 5/45* (2006.01)

(52) U.S. Cl.
CPC .......... *C09D 5/1625* (2013.01); *C09D 133/064* (2013.01); *C08K 3/04* (2013.01); *C08K 5/45* (2013.01); *C09D 7/1233* (2013.01)

(58) Field of Classification Search
None
See application file for complete search history.

(56) References Cited

U.S. PATENT DOCUMENTS 3,212,936 A * 10/1965 McEvoy ................. H01M 4/96
252/182.1
6,303,078 B1 * 10/2001 Shimizu ................ D06M 16/00
422/14
6,676,954 B2 * 1/2004 Dai ......................... A01N 43/80
424/400
2002/0001618 A1 * 1/2002 Dai ......................... A01N 43/80
424/468
2007/0237738 A1 * 10/2007 Hanzlicek ................. A61L 2/18
424/76.2

FOREIGN PATENT DOCUMENTS

EP 1142477 A2 * 10/2001 ............. A01N 43/80
WO WO 2009045941 A1 * 4/2009 ............. A01N 25/26

* cited by examiner

*Primary Examiner* — Peter A. Salamon
(74) *Attorney, Agent, or Firm* — Kenneth Crimaldi

(57) ABSTRACT

A composition containing 4,5-dichloro-2-n-octylisothiazolin-3-one and an activated carbon having a surface area of at least 700 $m^2/g$.

10 Claims, No Drawings

CONTROLLED RELEASE COMPOSITION CONTAINING DCOIT

This invention relates to a controlled release composition containing 4,5-dichloro-2-n-octylisothiazolin-3-one (DCOIT).

Controlled release compositions containing DCOIT are disclosed in U.S. Pat. No. 6,676,954. However, there is a need for controlled release compositions which release DCOIT at a lower rate.

The problem addressed by this invention is to provide an improved controlled release formulation which provides long-term controlled release of DCOIT.

STATEMENT OF THE INVENTION

The present invention is directed to a composition comprising 4,5-dichloro-2-n-octylisothiazolin-3-one and an activated carbon having a surface area of at least 700 m$^2$/g.

DETAILED DESCRIPTION OF THE INVENTION

Unless otherwise specified, temperatures are in degrees centigrade (° C.), references to percentages are percentages by weight (wt %) and amounts and ratios of DCOIT are on an active ingredient basis. As used herein, when a collection of particles has D50 of a certain value, then 50 percent of the particles by volume have a diameter less than or equal to that value. For non-spherical particles, the diameter is the largest dimension. A marine coating composition is a coating composition that is capable of forming a dry coating on the surface of a marine object. After formation of the dry coating, the dry coating will adhere to the surface for a usefully long time, even when some or all of the coated surface remains under water for significant amounts of time (i.e., at least one hour per day). Marine objects are those that are put to use in environments in which some or all of the object is under water for significant amounts of time. Examples of marine objects include ships, piers, docks, pilings, fishnets, heat exchangers, dams, and piping structures, such as intake screens. Preferably, the substrate is a marine object.

Seawater is water from a sea or ocean. On average, seawater in the worlds oceans has a salinity of about 3.5 wt % and an average density at the ocean surface of 1.025 g/ml.

Artificial seawater is a mixture of water with dissolved mineral salts that simulates seawater. An example of artificial seawater is synthetic seawater available from RICCA (ASTM D1141).

Preferably, DCOIT and the activated carbon are present in a marine coating, i.e., a coating on a marine object. Preferably, the DCOIT and activated carbon are added to the liquid marine coating formulation prior to coating on the surface of the marine object. In one preferred embodiment of the invention, DCOIT and activated carbon are added separately to the liquid marine coating composition. In one preferred embodiment of the invention, DCOIT and activated carbon are combined prior to addition to the liquid marine coating composition. DCOIT may be adsorbed on activated carbon by mixing DCOIT, as a melt or as a solution, with the activated carbon. Suitable solvents for the DCOIT are any which dissolve DCOIT, do not destabilize it and do not react with activated carbon. Suitable solvents include alcohols, such as methanol, ethanol and propanol; esters, such as ethyl acetate and butyl acetate; ketones, such as acetone, methyl iso-butyl ketone and methyl iso-amyl ketone; xylenes; mineral spirits; and nitriles, such as acetonitrile. Preferred solvents are ($C_1$-$C_4$)alcohols, xylenes and mineral spirits. Preferably, DCOIT is dissolved or slurried in a solvent prior to mixing with activated carbon or the liquid marine coating.

The substrate for a marine coating may be an uncoated surface, e.g., a marine object, or another coating on the surface of the marine object, e.g., an underlayer of primer or paint on the surface. Preferably, the marine coating is an epoxy coating, a self-polishing coating (e.g., a metal acrylate copolymer paint, typically incorporating zinc or copper carboxylate groups, or a silyl acrylate copolymer paint) or a foul-release coating (e.g., silicone paint). Marine coating compositions comprise a binder and a solvent and optionally other ingredients. The solvent may be an organic solvent or water. Other ingredients may include inorganic pigments, organic pigments or dyes, and natural resins. Water-based coatings may also contain coalescents, dispersants, surface-active agents, rheology modifiers or adhesion promoters. Solvent-based coatings may also include extenders, plasticizers or rheology modifiers. A typical marine coating composition comprises 5 to 30% binders, up to 15% rosins/modified rosins, 0.5 to 5% plasticizers, 0.1 to 2% antisettling agent, 5 to 60% solvent, up to 65% cuprous oxide, up to 30% pigments (other than cuprous oxide) and up to 15% marine antifouling agents (including DCOIT). Preferably, the marine coating contains at least 0.5 wt % DCOIT, preferably at least 0.8 wt %, preferably at least 1 wt %, preferably at least 1.2 wt %, preferably at least 1.4 wt %, preferably at least 1.6 wt %, preferably at least 1.8 wt %, preferably at least 2 wt %; preferably the marine coating contains no more than 5 wt % DCOIT, preferably no more than 4.5 wt %, preferably no more than 4 wt %, preferably no more than 3.5 wt %, preferably no more than 3 wt %, preferably no more than 2.5 wt %, preferably no more than 2 wt %, preferably no more than 1.8 wt %. Preferably, the marine coating contains at least 1 wt % activated carbon, preferably at least 1.5 wt %, preferably at least 2 wt %, preferably at least 2.5 wt %, preferably at least 3 wt %, preferably at least 3.5 wt %; preferably the marine coating contains no more than 20 wt % activated carbon, preferably no more than 16 wt %, preferably no more than 14 wt %, preferably no more than 12 wt %, preferably no more than 10 wt %, preferably no more than 8 wt %.

Preferably, the weight ratio of activated carbon to DCOIT is at least 1:1, preferably at least 1.5:1, preferably at least 2:1, preferably at least 2.5:1, preferably at least 3:1; preferably the weight ratio is no greater than 12:1, preferably no greater than 10:1, preferably no greater than 8:1, preferably no greater than 6:1, preferably no greater than 5:1, preferably no greater than 4.5:1. Preferably, the weight ratio of activated carbon to DCOIT in a self-polishing coating is from 1.5:1 to 5:1, preferably 2:1 to 4:1. Preferably, the weight ratio of activated carbon to DCOIT in a foul release coating is from 2:1 to 10:1, preferably from 2:1 to 8:1, preferably from 3:1 to 8:1.

Preferably, the wet film thickness of the marine coating is at least 25 microns, preferably at least 50 microns, preferably at least 100 microns, preferably at least 200 microns; preferably no more than 500 microns, preferably no more than 400 microns, preferably no more than 300 microns. The thickness of the dry film formed upon cure of the wet coating would be expected to be less than the wet thickness by an amount corresponding to the solvent content of the wet coating material. Preferably, the dry (cured) film thickness of the marine coating is at least 20 microns, preferably at least 40 microns, preferably at least 80 microns, preferably at least 160 microns; preferably no more than 400 microns, preferably no more than 320 microns, preferably no more than 240 microns.

Suitable activated carbons include, for example, carbons such as those derived from coal, wood, coconut shells, lignin or animal bones. Activated carbon can be produced by physical or chemical treatment. Physical treatment entails the combination of the following processes: carbonization, pyrolysis of carbon at temperatures in the range 600-900° C., under anoxic conditions, and exposure of the carbonized carbon with an oxidative atmosphere (carbon dioxide, oxygen, or steam) at temperatures above 250° C. Chemical activation entails, prior to carbonization, impregnating the raw material with certain chemicals: an acid, strong base, or a salt (e.g., phosphoric acid, potassium hydroxide, sodium hydroxide, calcium chloride, and zinc chloride 25%), followed by carbonizing at lower temperatures (450-900° C.). Particularly preferred are high surface area "activated" carbons, such as those prepared by direct chemical activation. Petroleum Derived Carbons (by T. M. O'Grady and A. N. Wennerberg), American Chemical Society Symposium Series, Vol. 303, J. D. Bacha et al., eds., American Chemical Society Publications, Washington, D.C., (1986), may be consulted for further general and specific details on these activated carbons and their method of preparation. Preferably, the surface area of the activated carbon is at least 750 $m^2/g$ (measured by the BET method), preferably at least 800 $m^2/g$, preferably at least 900 $m^2/g$, preferably at least 1000 $m^2/g$, preferably at least 1200 $m^2/g$; preferably no more than 2500 $m^2/g$, preferably no more than 2200 $m^2/g$.

Preferably activated carbon has an average particle size (e.g., a D50), just prior to combining with DCOIT or the marine coating formulation, of no more than 100 microns (0.1 mm), preferably no more than 50 microns, preferably no more than 40 microns, preferably no more than 35 microns, preferably no more than 30 microns, preferably no more than 25 microns, preferably no more than 20 microns; preferably at least 5 microns, preferably at least 10 microns.

EXAMPLES

GERSTEL TWISTER polydimethylsiloxane (PDMS) coated stir bars were purchased from Gerstel Gmbh. The paints used were Interlux MICRON 66 paint ("M66"), INTERSLEEK 970 paint ("P970") and INTERSLEEK 731 ("P731"), obtained commercially and mixed according to manufacturer's directions, except for the addition of DCOIT as described below.

Paint was mixed with DCOIT and adsorbent using orbital shaker (Red Devil Inc, USA) and applied on a Leneta paper or aluminum foil using a stainless steel gauge (wet film thickness 500 micrometer). Paint was dried overnight.

Paper on an appropriate support (20-40 sq·cm of paint surface) was immersed into 120 ml glass bottle containing 100 ml of artificial seawater, Twister stirring bar was inserted, and the bottle was placed on a stirring mixer. The stirring rate was 600 rpm. At day 1, 4, 7, 14, and 21, TWISTER bars were removed from bottles, wiped with paper towel and placed into HPLC vials containing 1 ml of acetonitrile. Adsorbed biocide was extracted at 35 C for 30 min. After extraction bars were wiped again and returned back to a bottles with seawater/MAF paint. The concentration of biocides was measured by HPLC. Agilent 1200 HPLC equipped with autosampler, column heater and diode-array detector was controlled by Chemstation software. DCOIT was analyzed using Ultra C18 column 150×4.6 cm (Restek Inc). The same isocratic conditions (70% acetonitrile, 2.3 ml/min) were used. DCOIT was detected at 280 nm. External standard technique was used for quantization of released biocides. Twister stirring bar capacity was estimated as 400 micrograms based on previous calibrations. Cumulative release of DCOIT is reported in weight percent, based on the weight of DCOIT in the coating composition.

| Cumulative Release of DCOIT (% of total DCOIT released by indicated day) | | | | | |
|---|---|---|---|---|---|
| Paint/DCOIT/carbon | Day 1 | Day 3 | Day 7 | Day 14 | Day 21 |
| I731/1.2% DCOIT/4.8% SN-20 | 0.67 | 1.99 | 3.05 | 4.25 | 5.26 |
| I731/1.2% DCOIT/4.8% RG-C | 0.74 | 1.45 | 2.23 | 2.78 | 3.60 |
| I731/1.2% DCOIT/4.8% HD | 0.57 | 1.29 | 1.72 | 2.34 | 2.84 |
| I731/1.2% DCOIT/4.8% CGP SUPER | 0.64 | 1.42 | 2.37 | 3.33 | 3.81 |
| I731/1.2% DCOIT/4.8% KB-G | 0.74 | 1.68 | 2.54 | 3.46 | 4.53 |
| I731/2% DCOIT - Control | 6.94 | 12.9 | 17.1 | 19.6 | 21.2 |
| I970/1% DCOIT/2% G-60 | 4.53 | 8.91 | 13.3 | 16.7 | 20.2 |
| I970/1% DCOIT/2% KB-G | 2.28 | 4.78 | 6.99 | 8.64 | 10.9 |
| I970/1% DCOIT/2% KB-WJ | 2.82 | 5.09 | 7.85 | 11.2 | 13.1 |
| I970/1% DCOIT/4% G-60 | 2.41 | 4.69 | 7.03 | 8.95 | 11.2 |
| I970/1% DCOIT/4% KB-G | 1.06 | 2.31 | 3.22 | 3.88 | 4.99 |
| I970/1% DCOIT - Control | 8.33 | 15.6 | 21.7 | 27.0 | 31.1 |
| SPC/1% DCOIT/3% KB-G | 1.57 | 4.60 | 6.53 | 8.40 | 11.1 |
| SPC/1% DCOIT - Control | 5.52 | 9.79 | 14.3 | 17.5 | 21.7 |
| I731/1% DCOIT/3% KB-G | 0.77 | 1.55 | 1.96 | 2.77 | 3.31 |
| I731/1% DCOIT/3% S-51 | 3.25 | 6.06 | 7.93 | 9.27 | 10.2 |
| I731/1% DCOIT/3% PAC 200 | 1.00 | 1.99 | 2.68 | 3.12 | 3.50 |
| I731/1% DCOIT/3% HD | 0.28 | 0.86 | 1.46 | 2.01 | 2.45 |
| I731/1% DCOIT ---CONTROL | 7.27 | 12.7 | 15.0 | 16.1 | 16.2 |
| I970/1% DCOIT/3% KB-G | 1.32 | 2.92 | 4.04 | 5.32 | 6.45 |
| I970/1% DCOIT/3% S-51 | 2.33 | 4.03 | 5.92 | 7.70 | 9.41 |
| I970/1% DCOIT/3% PAC 200 | 0.85 | 1.32 | 2.07 | 2.89 | 3.59 |
| I970/1% DCOIT/3% HD | 0.92 | 1.78 | 2.46 | 2.79 | 3.54 |
| I970/1% DCOIT ---CONTROL | 4.95 | 9.70 | 14.0 | 16.9 | 20.8 |

Notes:
DCOIT from SEANINE 211N biocide (Dow Chem. Co.), 30% DCOIT in xylenes
"SPC" paint is MICRON 66 paint (International Paints), wet thickness 254 microns
"I970" is INTERSLEEK 970 FRC paint (International Paints), wet thickness 127 microns
"I731" is INTERSLEEK 731 FRC paint (International Paints), wet thickness 127 microns
Note:
G-60 not compatible with I731 paint at 4:1 loading needed

| Activated Carbons | | |
|---|---|---|
| abbreviation | full name | surface area, $m^2/g$ |
| HD | Nuchar HD | 1500-1900 |
| SN-20 | Nuchar SN-20 | 1400-1800 |
| RG-C | Nuchar RG-C | 1400-1800 |
| CGP SUPER | Norit CGP SUPER | 1500-1700 |
| KB-G | Darco KB-G | 1700 |
| KB-WJ | Darco KB-WJ | 1800 |

-continued

Activated Carbons

| abbreviation | full name | surface area, m²/g |
|---|---|---|
| G-60 | Darco G-60 | 600 |
| S-51 | Darco S-51 | 650 |
| PAC 200 | Norit PAC 200 | 1000-1150 |

The data demonstrate that much better controlled release is obtained when DCOIT is combined with an activated carbon having a surface area greater than 650 m²/g.

The invention claimed is:

1. A composition comprising 4,5-dichloro-2-n-octyl-isothiazolin-3-one and an activated carbon having a surface area of at least 700 m²/g.

2. The composition of claim 1 in which a weight ratio of activated carbon to 4,5-dichloro-2-n-octylisothiazolin-3-one is from 1.5:1 to 10:1.

3. The composition of claim 2 in which the 4,5-dichloro-2-n-octylisothiazolin-3-one and the activated carbon are present in a marine coating.

4. The composition of claim 3 in which the marine coating comprises from 0.5 to 4 wt % 4,5-dichloro-2-n-octylisothiazolin-3-one and from 1.5 to 16 wt % activated carbon.

5. The composition of claim 4 in which the activated carbon has a surface area from 800 to 2500 m²/g.

6. The composition of claim 5 which the marine coating is a foul release coating.

7. The composition of claim 5 in which the marine coating is a self-polishing coating.

8. The composition of claim 7 in which the self-polishing coating is a metal acrylate copolymer coating.

9. The composition of claim 5 in which the weight ratio of activated carbon to 4,5-dichloro-2-n-octylisothiazolin-3-one is from 2:1 to 8:1.

10. The composition of claim 9 in which the marine coating comprises from 1 to 3.5 wt % 4,5-dichloro-2-n-octylisothiazolin-3-one and from 2 to 12 wt % activated carbon.

* * * * *